United States Patent
Djordjev et al.

(10) Patent No.: US 7,072,531 B2
(45) Date of Patent: Jul. 4, 2006

(54) GAIN-ASSISTED ELECTROABSORPTION MODULATORS

(75) Inventors: Kostadin D. Djordjev, Cupertino, CA (US); Michael R. T. Tan, Menlo Park, CA (US); Chao-Kun Lin, Fremont, CA (US); Scott W. Corzine, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/944,372

(22) Filed: Sep. 16, 2004

(65) Prior Publication Data

US 2006/0056760 A1    Mar. 16, 2006

(51) Int. Cl.
*G02F 1/17*    (2006.01)
*G02F 1/035*   (2006.01)

(52) U.S. Cl. ............................................ 385/2; 359/247
(58) Field of Classification Search ............... None
See application file for complete search history.

(56) References Cited

U.S. PATENT DOCUMENTS

| 6,633,696 | B1 * | 10/2003 | Vahala et al. ................ 385/27 |
| 6,871,025 | B1 * | 3/2005 | Maleki et al. ............... 398/183 |
| 2003/0202555 | A1 * | 10/2003 | Liu et al. ....................... 372/94 |
| 2004/0037341 | A1 * | 2/2004 | Tan et al. ...................... 372/94 |

* cited by examiner

*Primary Examiner*—Michelle Connelly-Cushwa
*Assistant Examiner*—Jerry T Rahll

(57) ABSTRACT

A light modulator having a waveguide and a resonator is disclosed. The waveguide routes light of wavelength $\lambda$ past the resonator. The resonator is coupled to the waveguide such that a portion of the light is input to the resonator, the resonator having a resonance at $\lambda$. The resonator includes a gain region in which light of wavelength $\lambda$ is amplified and an absorption region in which light of wavelength $\lambda$ is absorbed, the absorption region having first and second states, the first state absorbing less light of wavelength $\lambda$ than the second state, the state of the absorption region is determined by an electrical signal coupled to the absorption region. The gain region provides a gain that compensates for the light absorption in the first state. In one embodiment, the waveguide and resonator are critically coupled when the absorption region is in the second state.

14 Claims, 9 Drawing Sheets

GAIN-ASSISTED ELECTROABSORPTION MODULATORS

STATEMENT REGARDING FEDERALLY SPONSERED REASEARCH OR DEVELOPMENT

The U.S. Government has a paid-up license in this invention and the right in limited circumstances to require the patent owner to license others on reasonable terms as provided for by the terms of contract No. MDA 972-03-3-004 awarded by the Defense Advanced Research Projects Agency (DARPA) of the U.S.

BACKGROUND OF THE INVENTION

Communication systems based on modulated light sources are well known to the art. In high-speed communication systems, the light source is typically a laser. At frequencies below 10 GHz, the modulation can be imparted to the light source by turning the laser on and off. Unfortunately, this type of laser modulation leads to increased line width in the laser light. At frequencies at or above approximately 10 Ghz, this increased line width cannot be tolerated.

Accordingly, light sources that are to be modulated at frequencies above 10 GHz are typically constructed by providing a laser that runs continuously and a separate light modulator that modulates the intensity of the laser output. Modulators based on electro-absorption utilize a structure that is similar to a laser in that it includes a number of quantum well layers through which the light must propagate. The modulator typically has a transmissive state and an opaque state, which are switched back and forth by applying a potential across the modulator. The electrodes to which the signal is applied present a capacitive load to the driving circuitry, and hence, the modulator section is preferably as short as possible to minimize this capacitive load. In addition, high frequency driving circuitry preferably switches relatively small voltages, since such circuitry utilizes very small transistors that cannot withstand large voltages. Hence, low voltage, short modulators are preferred. Unfortunately, the length of the modulator must be sufficient to provide the desired contrast between the transmissive and opaque states of the modulator.

One promising design that provides short modulator sections that can operate at low voltage utilizes a resonant cavity that is coupled to a waveguide through which the signal that is to be modulated propagates. At "critical coupling", the losses incurred by the light in making one trip around the resonator exactly equals the amount of light that is coupled into the resonator. When this occurs with light that has a wavelength equal to one of the resonances of the resonator, all of the light in the waveguide is extinguished, and hence the system has a transmission of 0. When the loss around the resonator is not at the critical coupling level, a portion of the light travels down the waveguide.

The amount of light absorbed in the resonator at each pass is determined by a voltage placed across the resonator. The voltage is set such that the resonator is critically coupled at a first voltage and less than critically coupled at a second voltage. Hence, by switching the voltage across the resonator between these two values, the light traveling in the waveguide is modulated from 0 to some transmission T that depends on the losses in the resonator at the second voltage. Ideally, T is equal to 1. That is, all of the light entering the waveguide leaves the waveguide in the transmissive state of the modulator. To achieve this ideal state, all of the losses in the resonator at the second voltage must be zero. This condition is difficult to meet in practical resonators, and hence, modulators of this design are less than ideal.

SUMMARY OF THE INVENTION

The present invention includes a light modulator having a waveguide and a resonator. The waveguide routes light of wavelength λ past the resonator. The resonator is coupled to the waveguide such that a portion of the light is input to the resonator, the resonator having a resonance at λ. The resonator includes a gain region in which light of wavelength λ is amplified and an absorption region in which light of wavelength λ is absorbed, the absorption region having first and second states, the first state absorbing less light of wavelength λ than the second state, the state of the absorption region is determined by an electrical signal coupled to the absorption region. The gain region provides a gain that compensates for the total light loss in the first state. In one embodiment, the waveguide and resonator are critically coupled when the absorption region is in the second state. The resonator can be of any geometry including a microdisk resonator, a micro-ring resonator, and a folded cavity resonator. In one embodiment, the resonator includes a layered structure having a quantum well layer, the quantum well layer having different bandgap energies in the gain and absorption regions. In one embodiment, the layered structure includes a waveguide region different from the gain and absorption regions in the layered structure, the quantum well layer in the waveguide region and the gain region-has different bandgap energies. In one embodiment, the resonator is vertically coupled to the waveguide.

DETAILED DESCRIPTION OF THE PREFERRED EMBODIMENTS OF THE INVENTION

Figures 1, 2:
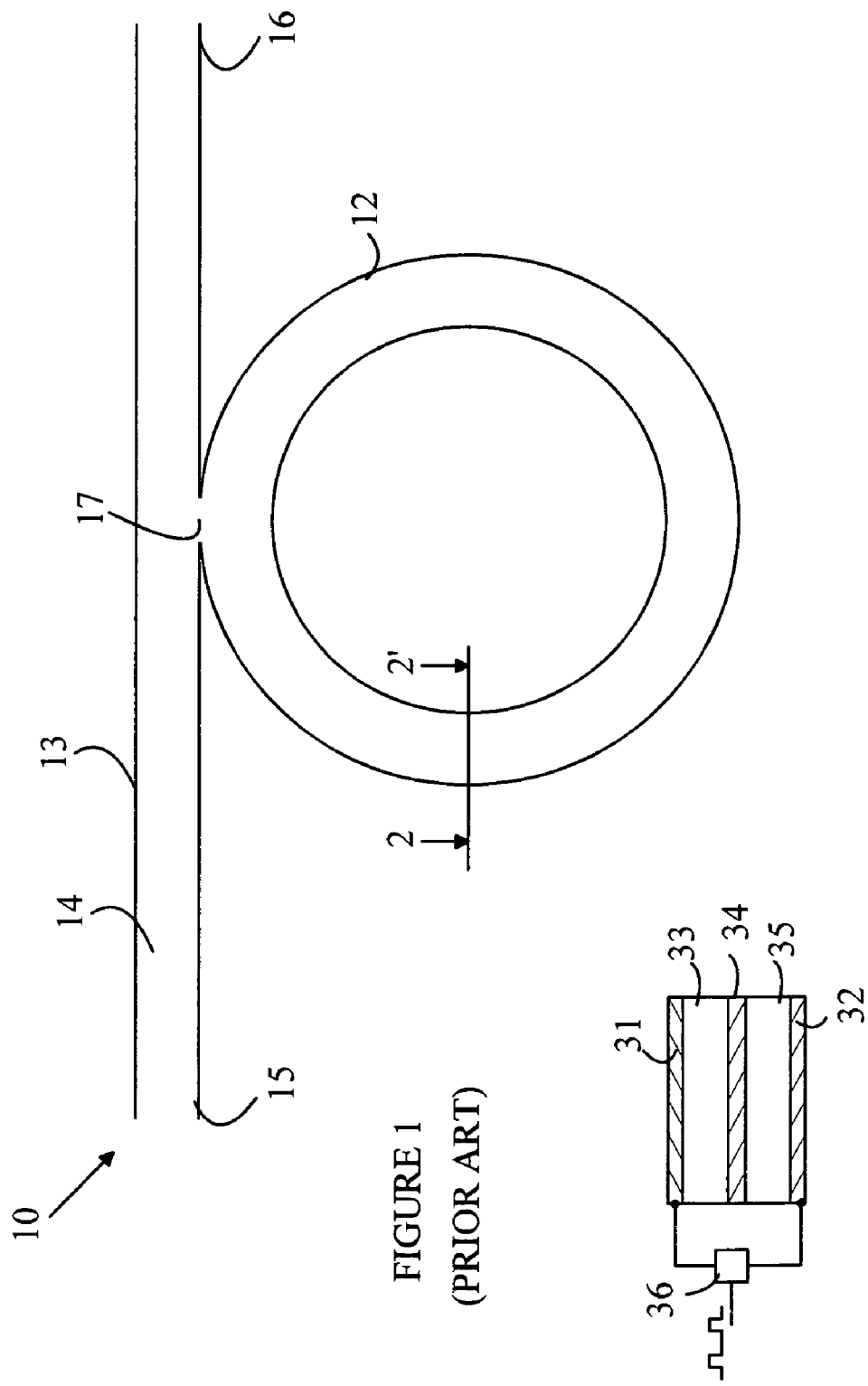
FIG. 1 is a top schematic drawing of a modulator constructed from a microdisk resonator and a waveguide.
FIG. 2 is a cross-sectional view of a portion of microdisk resonator 12 through line 2–2' as shown in FIG. 1.

The manner in which the present invention operates may be more easily understood with reference to FIGS. 1 and 2, which illustrate a prior art modulator based on a microdisk resonator. FIG. 1 is a top schematic drawing of a modulator 10 constructed from a microdisk resonator 12 and a waveguide 13. Waveguide 13 has an input end 15 and an output end 16. FIG. 2 is a cross-sectional view of a portion of microdisk resonator 12 through line 2–2'. Consider coherent light 14 propagating from input end 15 of waveguide 13. Denote the wavelength of the light signal by λ. Microdisk resonator 12 is positioned relative to waveguide 13 such that some fraction of light 14 is transferred to microdisk resonator 12 in the coupling region 17. This light excites the resonant optical mode within the microdisk resonator. If the losses in the resonator are sufficiently low, the light intensity builds up with each round trip pass of the light around the microdisk. A portion of the light in the resonator is coupled back into the input waveguide at 180 degrees out of phase. The transmission at the output end 16 of the input waveguide is reduced with each round trip pass while the power within the resonator increases.

Referring to FIG. 2, the resonator includes an absorption region having a bulk absorption layer or one or more quantum well layers 34 sandwiched between cladding regions 33 and 35 that guide the light in the resonator. The absorption of the quantum well layers depends on the potential across layer 34, which is set by applying an electrical signal between electrodes 31 and 32 using drive circuit 36. By adjusting the potential between these electrodes, the absorption within the resonator can be switched between two states having different absorptions.

Figure 3:
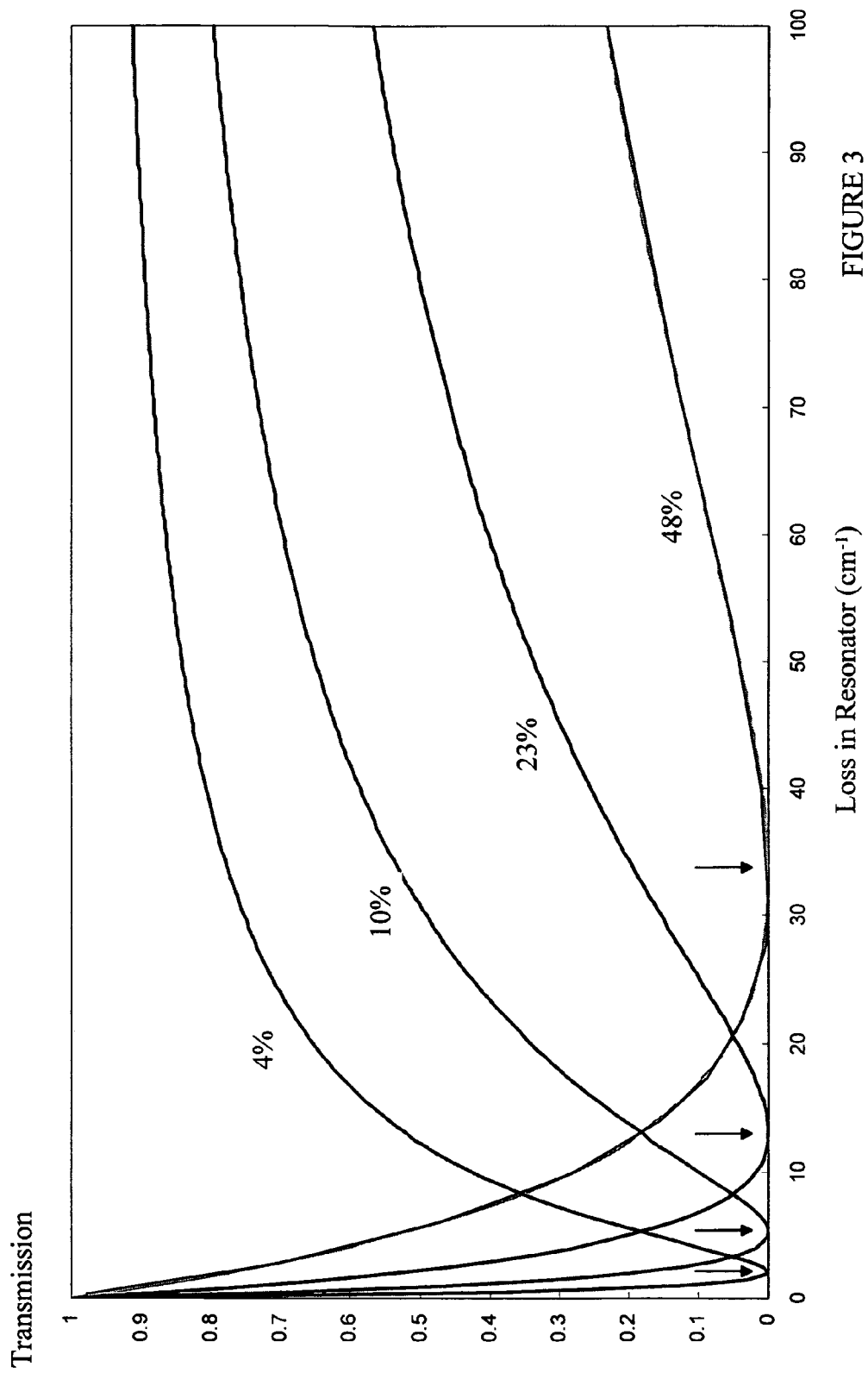
FIG. 3 is a graph of the transmission past a single ring resonator for a number of different coupling factors between 4% and 48%.

The transmission past the resonator depends on two parameters, the power coupling factor into the resonator, and the losses inside the resonator. The losses in the resonator result from the absorption of the light by the material from which the resonator is constructed, scattering light lost at the bends in the waveguide, and light lost due to the change in absorption induced by altering the potential across the resonator. Refer now to FIG. 3, which is a graph of the transmission past a single ring resonator for a number of different coupling factors between 4% and 48%. The arrows mark the critically coupled condition for each coupling factor. At critical coupling, the transmission past the microdisk is zero.

Ideally, the modulator is operated with one of its states at the critically coupled operating point. That is, one of the two absorption states described above is set to provide the attenuation needed for the resonator to be critically coupled in that state. The second state is chosen with two considerations in mind, the voltage needed to switch the absorber between the states and the transmission in the second state. Ideally, the second state would have an absorption of zero and correspond to a zero voltage across the absorber. This would correspond to operating between a zero loss point and the critically coupled point on the curves shown in FIG. 3. Such a device would have an infinite extinction ratio and a zero insertion loss. That is, the intensity of light at point 16 in the waveguide would be the same as that at point 15 when the modulator was set to the transmissive state.

Unfortunately, achieving an absorption of zero is not possible with microdisk resonators constructed using economically practical fabrication systems. There are always some losses present even at zero voltage across the absorber. These losses arise from material losses, fabrication imperfections, surface roughness that scatters some of the light, etc. In this regard, it should be noted that even a small residual absorption in this region of the transmission curve leads to a large change in T. Hence, such devices have large losses even in the transmissive state. Furthermore, these losses will vary from device to device, and hence, the insertion loss may not be uniform from device to device.

Figure 4:
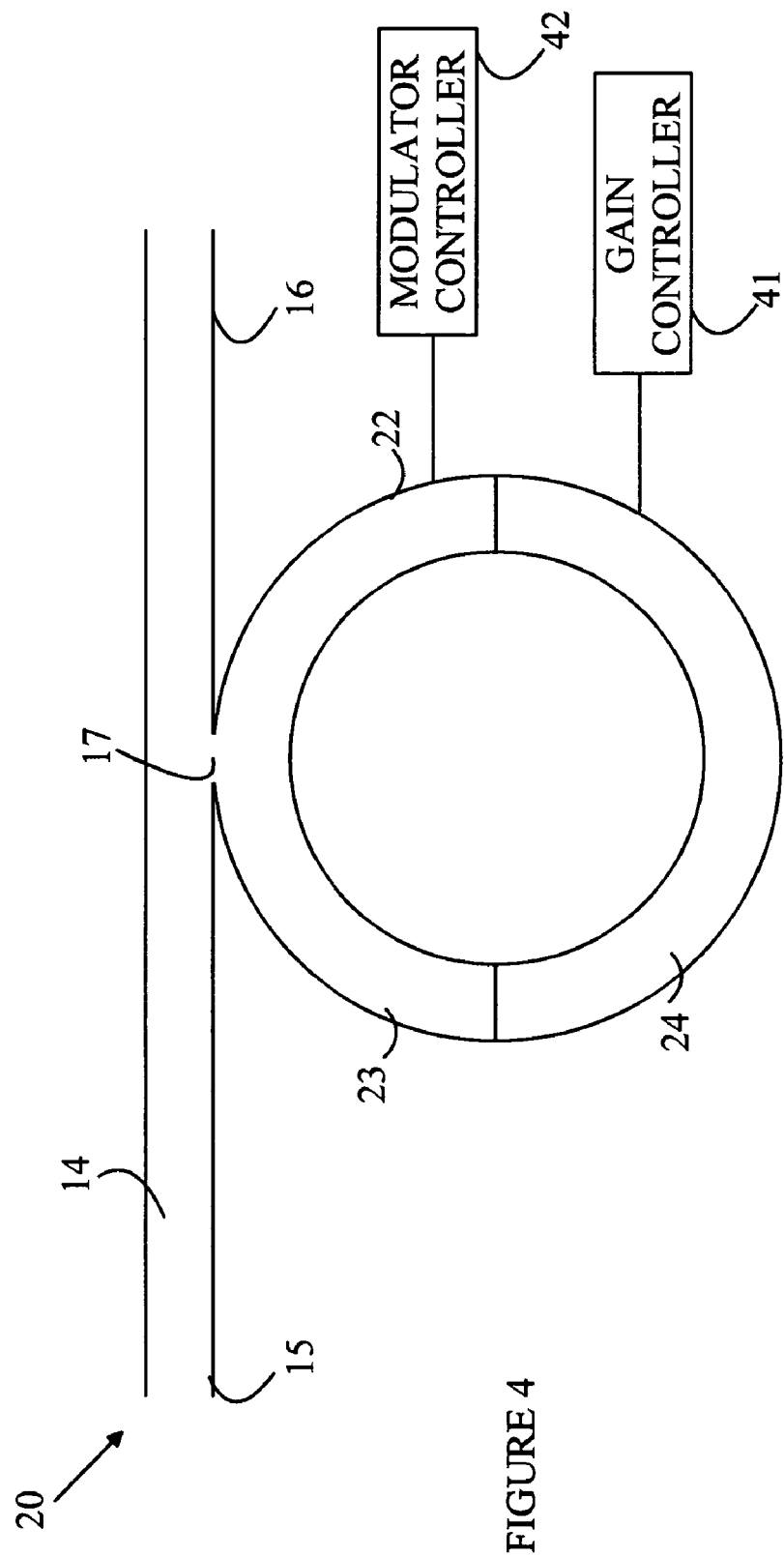
FIG. 4 is a top schematic view of a modulator according to one embodiment of the present invention.

Refer now to FIG. 4, which is a top schematic view of a modulator according to one embodiment of the present invention. To simplify the following discussion, those elements of modulator 20 that serve functions analogous to those discussed above with reference to modulator 10 have been given the same numeric designations and will not be discussed in detail here. In the following discussion, it will be assumed that the modulator is operating between the minimum absorption of the resonator and critical coupling, i.e., in the region to the left of the critical coupling points shown in FIG. 3.

Modulator 20 utilizes a resonator having an active gain section to compensate for the losses in resonator 22 incurred in the transmissive state, i.e., the losses incurred when the absorber section 23 is set to its minimum absorption. Since the residual losses are relatively small, gain section 24 need only provide a small gain to compensate for these losses. In modulator 22, the resonant cavity is divided into two sections that can be biased independent of one another. The bias voltage for absorption section 23 is provided by modulator controller 42, and the bias voltage for gain control section 24 is provided by gain controller 41. The bias voltage in section 23 is switched to modulate the light signal in the waveguide at point 16. The bias voltage in section 24 is maintained at a constant value to compensate for the losses in the resonator that are present when section 23 is set to the transmissive state. It is also desirable to have the gain section in the absorber so as to amplify only the resonant wavelength of interest.

The manner in which one embodiment of a modulator according to the present invention is fabricated will now be discussed in more detail. For the purposes of this discussion, it will be assumed that the modulator is in the same plane as the waveguide and that the modulator is a microdisk modulator as opposed to the ring modulator discussed above.

In one embodiment of the present invention the microdisk resonator and waveguide are constructed from InP-based materials. For the purposes of this discussion, any material that is lattice matched to InP within 2–5 percent will be deemed to be an InP-based material. For example, InGaAsP, AlInAs, AlInGaAs, InGaP, InGaAs, AlGaAsSb, AlAsSb are examples of such materials.

The modulator can be divided into three separate regions, the waveguide region, the absorption region of the resonator, and the active gain region of the resonator. All of these regions can be constructed by using a common set of waveguiding quantum well layers that provide a high-index of refraction and are sandwiched between low index of refraction p- and n-doped cladding layers. Denote the wavelength of the light to be modulated by λ. The various regions described above can be viewed as a set of common layers with different bandgap energies in the different regions. The waveguide is preferably transparent to light of wavelength λ. In addition, the absorption portion of the resonator is also preferably transparent to light of wavelength λ when no potential is applied across this portion of the resonator. This arrangement can be achieved by adjusting the bandgap in the quantum well region in the absorption section and the waveguide region such that the quantum well layer has an absorption peak 40–50 nm shorter than λ in the absorption region and 80–100 nm shorter than λ in the waveguiding region When the appropriate potential is applied to the absorption region, this absorption peak will shift to provide the needed absorption at λ. In the active region, the bandgap is set to provide gain to light of wavelength λ. Hence, these different bandgap regions can be created by starting with a layer having the bandgap needed by the active gain region. The bandgap in the waveguide and resonator areas is then lowered by impurity induced disordering or vacancy induced disordering. For example, the active layer can be masked to protect the active gain section from impurities implanted in the absorption region and waveguide region.

Figure 5:
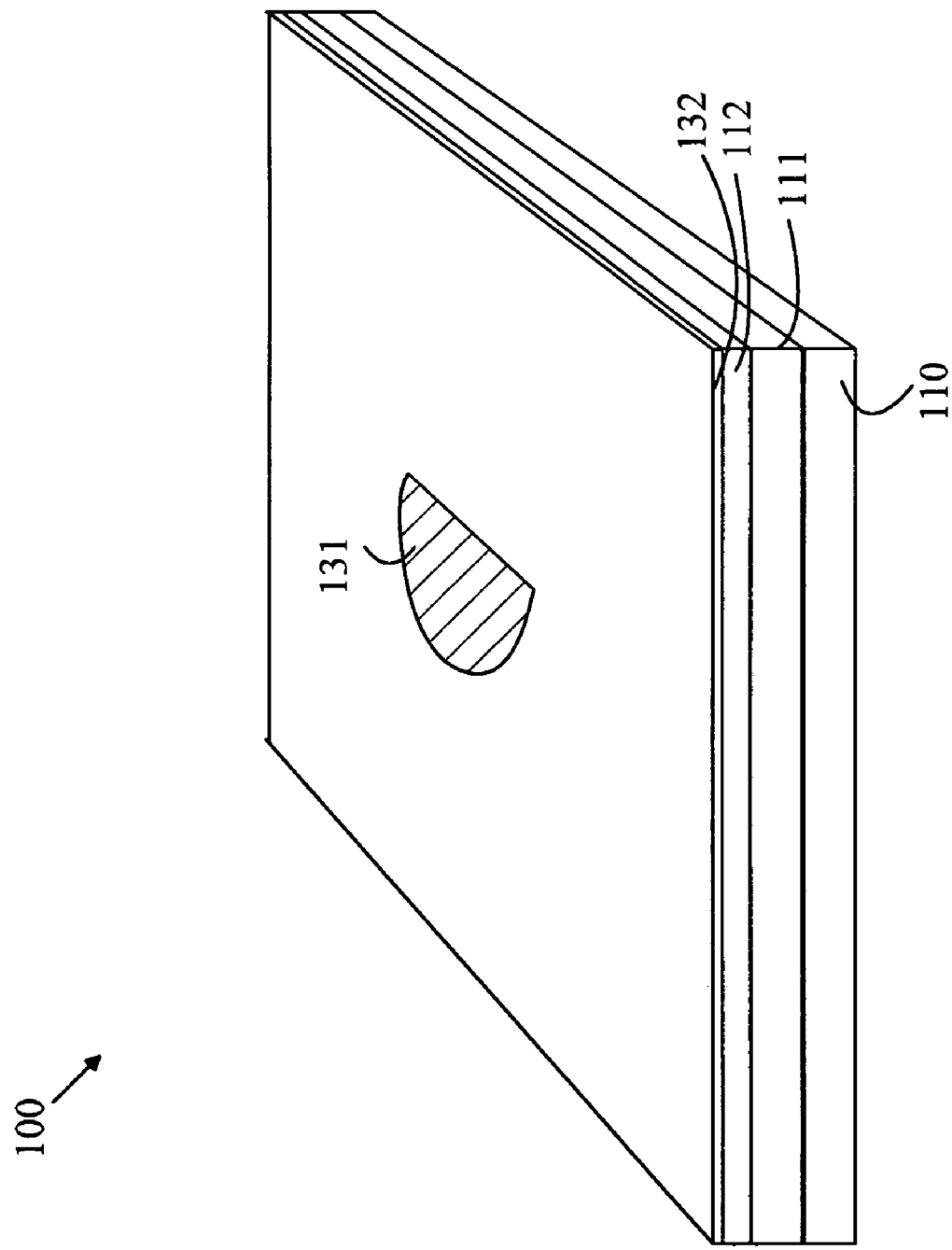
FIGS. 5–7 illustrate the construction of a modulator according to one embodiment of the present invention in the InP material system.
Figure 6:
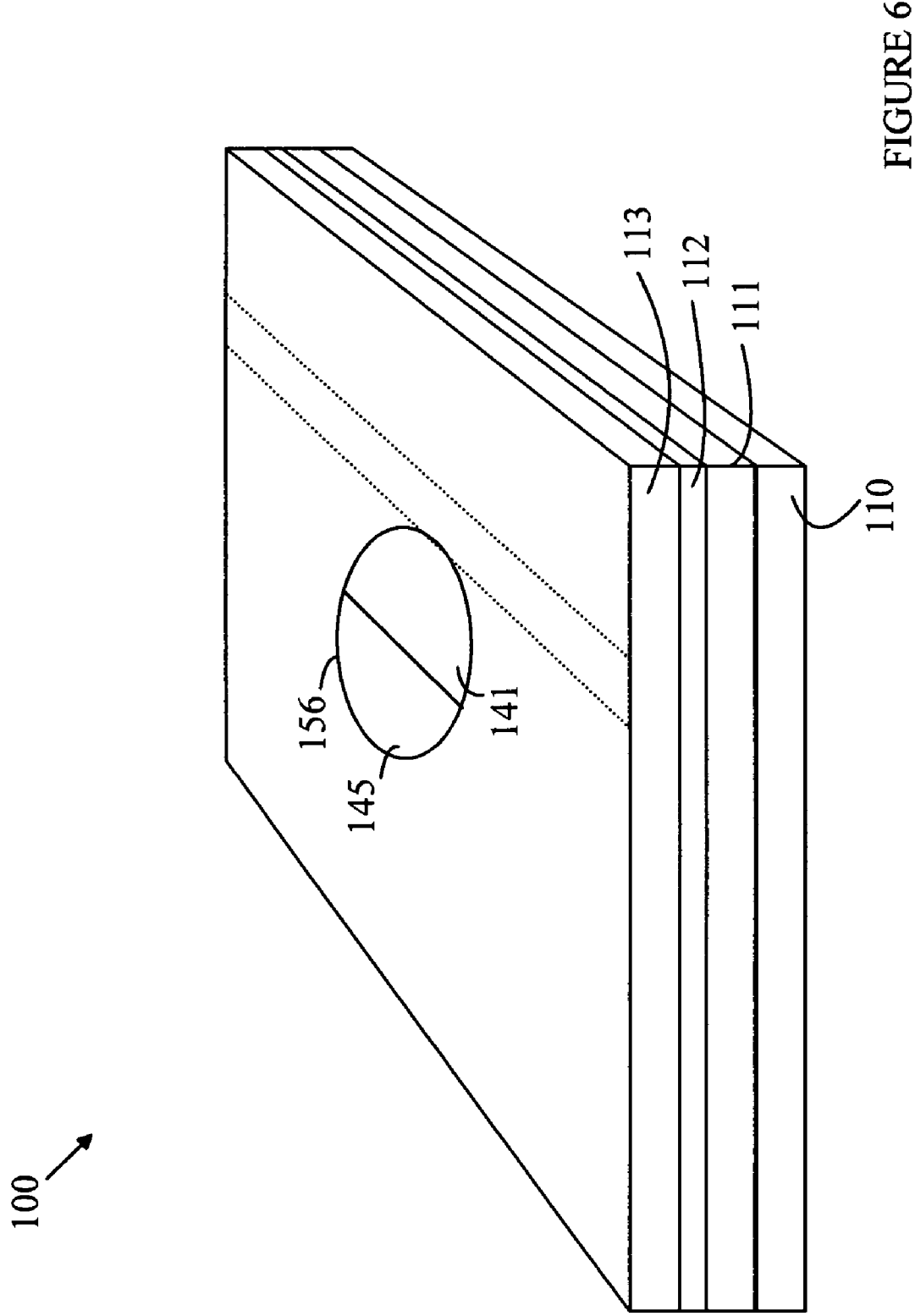
Figure 7:
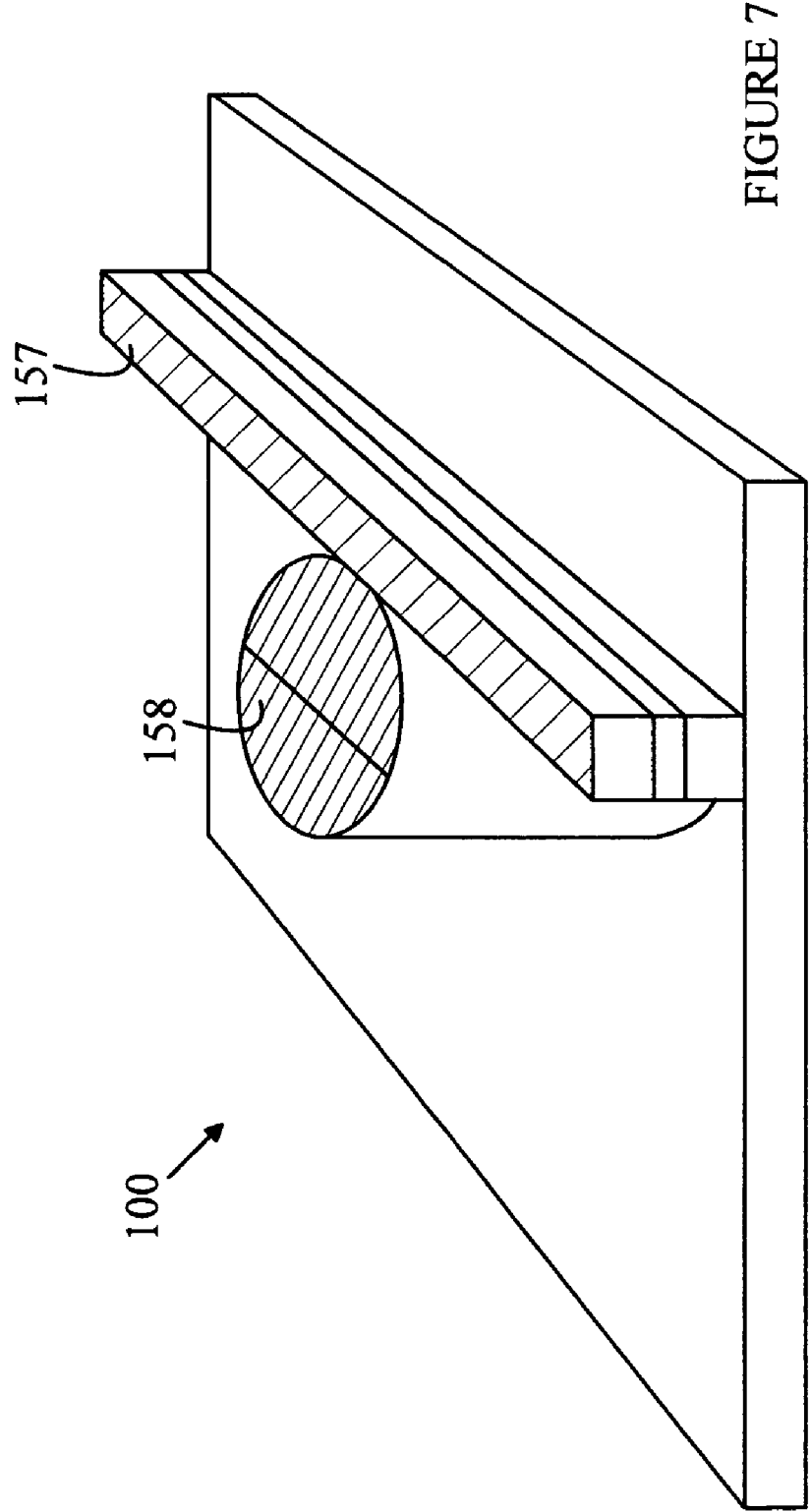

Refer now to FIGS. 5–7, which illustrate the construction of a modulator according to one embodiment of the present invention in the InP material system. The active gain region and absorption regions must be electrically isolated such that different electrical potentials can be applied across these regions. The active gain region is forward biased, while the absorption region is switched from no potential to a reversed biased condition. In one embodiment, this is accomplished by separating these two regions with a region that has been implanted with protons to provide an insulating barrier that extends through the active region. In another embodiment the top contact layer and part of the top p-cladding layer are etched to provide a high-resistive region for electrical isolation. The process begins by depositing the layers that will become the n-cladding layer 111 and active layer 112 on a substrate 110 as shown in FIG. 5. To simplify the discussion, it will be assumed that any n-contact layer needed to make electrical connections to the device is included in substrate 110.

An InP sacrificial layer 132 is then deposited over the active layer, and the region that is to become the gain region is masked with an appropriate material such as SiN to protect the region from implantation. The surface of the stack of layers is then implanted with phosphorous ions in the region that is not protected by mask 131. The InP region protects the active region from the damage that it would incur if the implantation and masking were performed directly on the active region. The implanted stack of layers is then subjected to a rapid annealing at high temperature to allow the implanted ions to diffuse into the active region and alter the bandgap of the quantum well layers in that region. The InP protective layer and SiN mask are then removed by a wet etch that stops on the active region.

Referring to FIG. 6, the p-cladding layer 113 is then applied to the layer stack. Again, to simplify the drawing, it will be assumed that any p-contact layer needed to spread the current is included in this layer. The boundaries of the two areas of the resonator that are to become the absorption region 141 and gain region 145 are then electrically isolated as shown at 156 such that the regions can be electrically driven independent of one another. The isolation could be performed by proton implantation or removal of the top contact layers, as discussed above. Referring to FIG. 7, the layered stack is then etched to provide an index of refraction differential between waveguide 157 and resonator 158 and the surrounding environment.

The above-described embodiments of the present invention require the creation of sub-micron features. To minimize bend losses, the microdisk resonator requires a large change in the index of refraction between the boundary of the resonator and the surrounding medium. This is accomplished by etching the area around the resonator and waveguide as described above. Unfortunately, this forces the width of the waveguide to be less than 0.5 μm. If the waveguide were wider than this, the waveguide would support multiple modes. While such structures are within the range of current manufacturing techniques, the cost of the submicron fabrication substantially increases the cost of the modulator. In addition, coupling into these narrow high index contrast waveguides from external optical fibers is difficult due to the different mode sizes. As a result, the coupling loss into the modulator increases.

Figure 8:
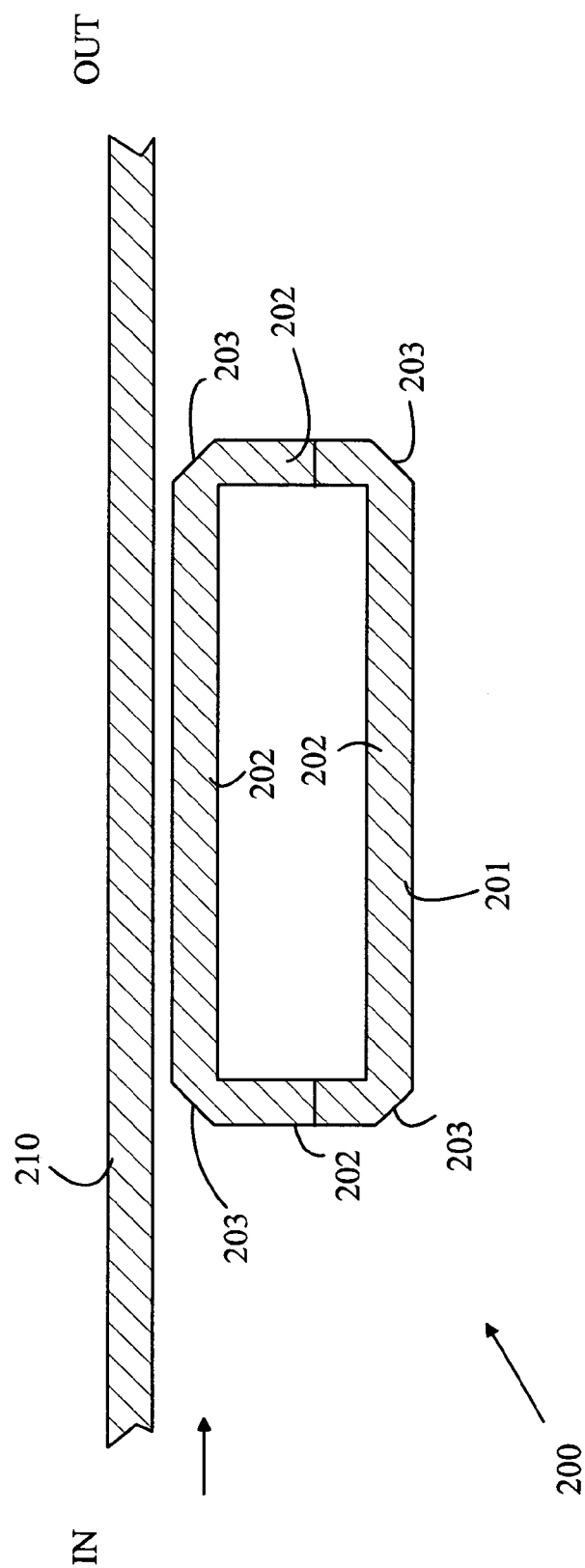
FIG. 8 is a simplified top view of an embodiment of a modulator according to another embodiment of the present invention.

Embodiments in which submicron structures are avoided can be constructed by using folded cavity resonators that do not require a large difference in index of refraction. Refer now to FIG. 8, which is a simplified top view of an embodiment of a modulator 200 according to another embodiment of the present invention. Modulator 200 utilizes a folded cavity resonator 201 coupled to a waveguide 210. Resonator 201 is constructed from straight waveguides 202 and 90° turning mirrors 203. The advantage of this configuration is that low index contrast waveguides may now be utilized, and hence, the maximum waveguide width that will be limited to one mode is much larger. Typically, the waveguide widths are on the order of 1–4 μm for waveguides constructed from Group III–V materials.

Figure 10:
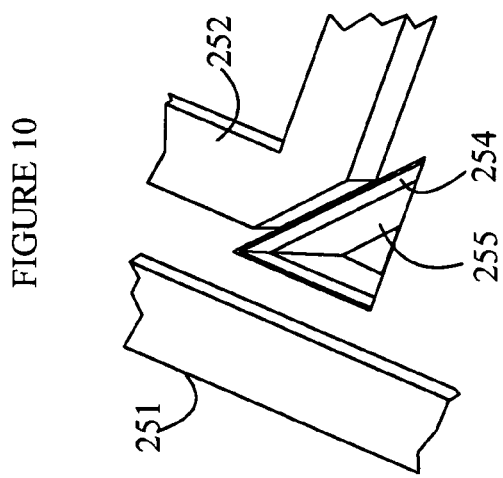
FIG. 10 is a magnified portion of the region of FIG. 9 shown at 260.
Figure 9:
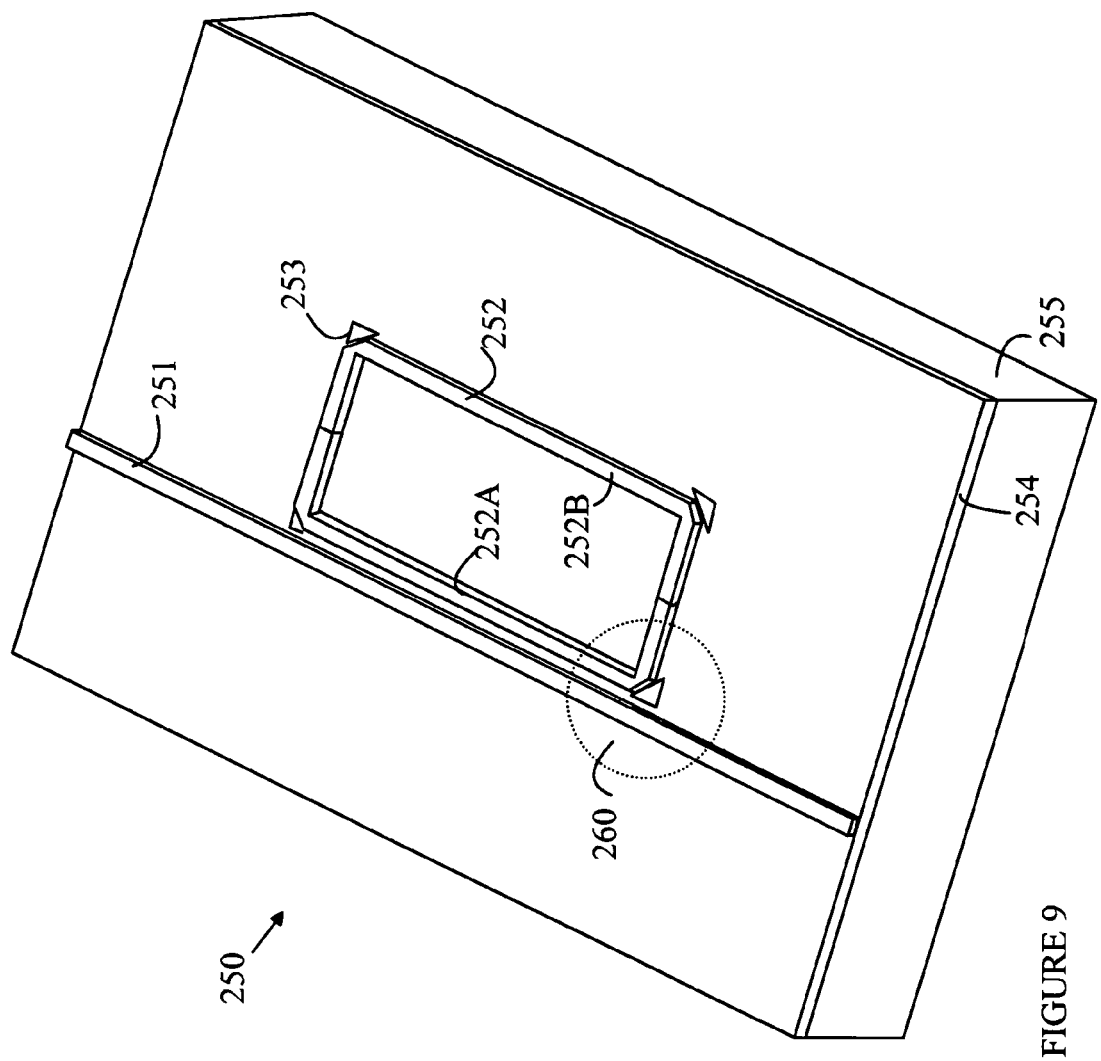
FIG. 9 is a prospective view of a folded cavity resonator according to one embodiment of the present invention

Refer now to FIGS. 9 and 10. FIG. 9 is a prospective view of a folded cavity modulator 250 according to one embodiment of the present invention. FIG. 10 is a magnified portion of the region of FIG. 9 shown at 260. Modulator 250 is constructed by fabricating the active layer 254 and cladding layers on top of a substrate 255, which includes the lower cladding layer. These layers are deposited in a manner analogous to that discussed above. A masking layer is deposited on top of these layers. This layer is then patterned to define the ridge waveguide 251, which is formed by etching into the top cladding layer. A similar ridge waveguide 252 is patterned over the region that is to become the folded mirror resonator. The mirrors in the folded mirror resonator are then created by etching holes 253 from the surface of the layered structure through the active region 254 and into substrate 255. The surface of this hole provides a boundary having a large change in index of refraction that acts as a turning mirror with a high reflection coefficient, for example, a reflection coefficient greater than 0.9. After formation of the ridge waveguides and turning mirrors, metal electrodes are placed on top of the folded resonator contacts to the gain and absorption regions shown at 252A and 252B, respectively.

The above-described embodiments of the present invention utilized specific resonator geometries, namely microdisks, micro-rings and folded cavities. However other geometries can be utilized. For example, resonators in the shape of a racetrack can be utilized. Any geometry that can accommodate both the absorption modulated region and the gain region can, in principle, be utilized.

Figure 11:
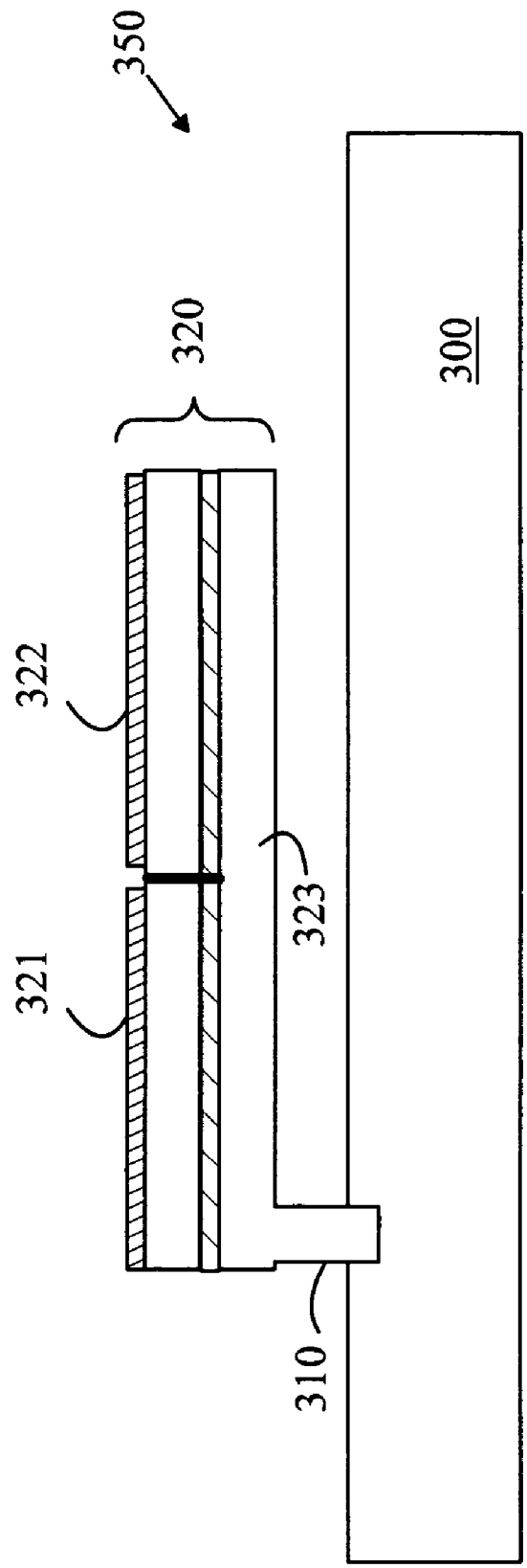
FIG. 11 is a cross-sectional view of a modulator according to another embodiment of the present invention.

The above-describe embodiments all utilized resonators that are in the same plane as the waveguide. However, arrangements in which the resonator is located over the waveguide and coupled vertically are also possible. Refer now to FIG. 11, which is a cross-sectional view of a modulator 350 according to another embodiment of the present invention. Modulator 350 is constructed on a substrate 300 by depositing and etching the layers needed to construct waveguide 310. Resonator 320 is then constructed over substrate 300 either by depositing further layers on substrate 300 or by constructing resonator 320 on a separate substrate and then bonding the prefabricated resonator to waveguide 310 utilizing thermal diffusion bonding. Methods for fabricating such structures utilizing thermal diffusion bonding are taught in Djordjev, et al (IEEE Photonics Tech. Let. Vol. 14 No. 3). Methods for fabricating such structures by depositing further layers on substrate 300 are taught in co-pending U.S. patent application Ser. No. 10/227,000 filed Aug. 22, 2002 by Tan, et al., which is hereby incorporated by reference. The embodiment shown in FIG. 11 also shows two electrodes 321 and 322 used to drive the attenuation and gain sectors. The area between substrate 300 and resonator 320 can be filled with a material having an index of refraction less than that of cladding layer 323. In addition, other support members may be fabricated under resonator 320.

Various modifications to the present invention will become apparent to those skilled in the art from the foregoing description and accompanying drawings. Accordingly, the present invention is to be limited solely by the scope of the following claims.

What is claimed is:

1. A light modulator comprising;
   a waveguide routing light of wavelength $\lambda$; and
   a resonator coupled to said waveguide such that a portion of said light is input to said resonator, said resonator having a resonance at $\lambda$ and comprising a gain region in which light of wavelength $\lambda$ is amplified and an absorption region in which light of wavelength $\lambda$ is absorbed, said absorption region having first and second states, said first state absorbing less light of wavelength $\lambda$ than said second state, said state of said absorption region being determined by an electrical signal coupled to said absorption region.

2. The light modulator of claim 1 wherein said gain region provides a gain that compensates for said light absorption in said first state.

3. The light modulator of claim 1 wherein said waveguide and resonator are critically coupled when said absorption region is in said second state.

4. The light modulator of claim 1 wherein said resonator is a microdisk resonator.

5. The light modulator of claim 1 wherein said resonator is a micro-ring resonator.

6. The light modulator of claim 1 wherein said resonator is a folded cavity resonator.

7. The light modulator of claim 1 wherein said resonator comprises a layered structure having a quantum well layer, said quantum well layer having different bandgap energies in said gain and absorption regions.

8. A light modulator comprising;
   a waveguide routing light of wavelength $\lambda$; and
   a resonator coupled to said waveguide such that a portion of said light is input to said resonator, said resonator having a resonance at $\lambda$ and comprising a gain region in which light of wavelength $\lambda$ is amplified and an absorption region in which light of wavelength $\lambda$ is absorbed, said absorption region having first and second states, said first state absorbing less light of wavelength $\lambda$ than said second state, said state of said absorption region being determined by an electrical signal coupled to said absorption region;
   wherein said resonator comprises a layered structure having a quantum well layer, said quantum well layer having different bandgap energies in said gain and absorption regions;
   wherein said waveguide comprises a waveguide region in said layered structure, said waveguide region being different from said gain and absorption regions in said layered structure and wherein said quantum well layer in said waveguide region and said gain region has different bandgap energies.

9. A light modulator comprising;
   a waveguide routing light of wavelength $\lambda$; and
   a resonator coupled to said waveguide such that a portion of said light is input to said resonator, said resonator having a resonance at $\lambda$ and comprising a gain region in which light of wavelength $\lambda$ is amplified and an absorption region in which light of wavelength $\lambda$ is absorbed, said absorption region having first and second states, said first state absorbing less light of wavelength $\lambda$ than said second state, said state of said absorption region being determined by an electrical signal coupled to said absorption region;
   wherein said resonator is vertically coupled to said waveguide.

10. A method for modulating a light signal of wavelength $\lambda$ traveling in a waveguide, said method comprising:
    coupling a portion of said light into a resonator having a resonance at $\lambda$;
    attenuating said light in said resonator by either a first or second attenuation factor; and
    amplifying light traveling in said resonator by an amount that is less than or equal to said first attenuation factor.

11. The method of claim 10 wherein said attenuation factor is determined by applying an electrical signal to said resonator.

12. The method of claim 10 wherein said resonator is a microdisk resonator.

13. The method of claim 10 wherein said resonator is a micro-ring resonator.

14. The method of claim 10 wherein said resonator is a folded cavity resonator.

* * * * *